US009252967B2

(12) United States Patent
Li et al.

(10) Patent No.: US 9,252,967 B2
(45) Date of Patent: Feb. 2, 2016

(54) FACILITATED USE OF HETEROGENEOUS HOME-AUTOMATION EDGE COMPONENTS

(75) Inventors: Adam H. Li, Solana Beach, CA (US); Aixin Liu, San Diego, CA (US); Djung Nguyen, San Diego, CA (US)

(73) Assignee: Sony Corporation, Tokyo (JP)

( * ) Notice: Subject to any disclaimer, the term of this patent is extended or adjusted under 35 U.S.C. 154(b) by 266 days.

(21) Appl. No.: 13/223,314

(22) Filed: Sep. 1, 2011

(65) Prior Publication Data
US 2013/0060358 A1 Mar. 7, 2013

(51) Int. Cl.
G06F 17/00 (2006.01)
H04L 12/28 (2006.01)
G05B 15/02 (2006.01)

(52) U.S. Cl.
CPC ............ *H04L 12/2829* (2013.01); *G05B 15/02* (2013.01); *H04L 12/2809* (2013.01); *H04L 12/2825* (2013.01); *G05B 2219/2642* (2013.01)

(58) Field of Classification Search
CPC ........... G05B 15/02; G05B 2219/2642; H04L 12/2809
USPC .................................................. 700/1, 11, 19
See application file for complete search history.

(56) References Cited

U.S. PATENT DOCUMENTS

| 6,434,447 | B1 | 8/2002 | Shetyn |
| 7,139,716 | B1 | 11/2006 | Gaziz |
| 7,403,838 | B2 | 7/2008 | Deen et al. |
| 7,464,035 | B2 | 12/2008 | Funk et al. |
| 8,548,607 | B1 * | 10/2013 | Belz et al. .................. 700/21 |
| 2004/0203387 | A1 | 10/2004 | Grannan |
| 2004/0260407 | A1 | 12/2004 | Wimsatt |
| 2005/0125083 | A1 * | 6/2005 | Kiko .............................. 700/19 |
| 2005/0246408 | A1 | 11/2005 | Chung |
| 2008/0183316 | A1 * | 7/2008 | Clayton ....................... 700/90 |
| 2008/0265799 | A1 * | 10/2008 | Sibert ......................... 315/292 |
| 2008/0271123 | A1 * | 10/2008 | Ollis et al. ..................... 726/4 |
| 2008/0279202 | A1 | 11/2008 | Choi et al. |
| 2010/0071053 | A1 | 3/2010 | Ansari et al. |
| 2010/0332235 | A1 | 12/2010 | Ben |
| 2011/0051823 | A1 | 3/2011 | Imes |
| 2013/0014219 | A1 * | 1/2013 | Kraus et al. .................... 726/3 |

FOREIGN PATENT DOCUMENTS

EP 1624398 2/2006

OTHER PUBLICATIONS

Li et al.; U.S. Appl. No. 13/223,312, filed Sep. 1, 2011.
Li et al.; U.S. Appl. No. 13/223,313, filed Sep. 1, 2011.
Li et al.; U.S. Appl. No. 13/223,314, filed Sep. 1, 2011.
Abstract of Bjelica, Milan Z. et al., "A Concept and Implantation of the Embeddable Home Controller", MIPRO, 2010 Proceedings of the 33rd International Convention May 24-28, 2010, pp. 686-690 1 page).

(Continued)

*Primary Examiner* — Mohammad Ali
*Assistant Examiner* — Ziaul Karim
(74) *Attorney, Agent, or Firm* — Fitch, Even, Tabin & Flannery LLP

(57) ABSTRACT

A control circuit operably couples to a plurality of home-automation edge-component interfaces. This control circuit is configured to compatibly interact with a plurality of home-automation edge components where at least some of the plurality of home-automation edge components are operationally incompatible with one another.

8 Claims, 3 Drawing Sheets

(56) References Cited

OTHER PUBLICATIONS

Hsu-Chih, Chiang, "Implantation of an OSGi Based Home Automation and Networking System", A thesis submitted to the Graduate Division in partial fulfillment of the requirements of the degree of Master of Science in Computer Science and Information Engineering National Cheng King University Tainan, Taiwan, R.O.C., Jul. 2006, 98 pgs.

Abstract of Lee, N. C. et al., "Controllers for use by disabled people", *Computing & Control Engineering Journal, vol. 5, Issue 3*. Jun. 1994, p. 121-124 (1 page).

Abstract of Papadopoulos, N., "A Connected Home Platform and Development Framework for Smart Home Control Applications", *Industrial Informatics, 2009. INDIN 2009. 7th IEEE International Conference* Jun. 23-26, 2009, pp. 402-409 (1 page).

Wolff, Sune, "Facilitating Home Automation Through Wireless Protocol Interoperability", *Aarhus School of Engineering, Engineering College of Aarhus, Aarhus University, The 12th International Symposium on Wireless Personal Multimedia Communications (WPMC'09)*, Jul. 9, 2009, 5 pages.

Non-final office action mailed Aug. 20, 2013, U.S. Appl. No. 13/223,312 (14 pgs.).

Non-final office action mailed Aug. 27, 2013, U.S. Appl. No. 13/223,313 (12 pgs.).

Admins_md, "Rasalie Home Automation for Android (beta)," blog, www.mediadezine.com/blog/rosalie-home-automation-android-beta, at least as early as Jun. 20, 2011 (2 pages).

Final Office Action from U.S Appl. No. 13/223,313 mailed Mar. 6, 2014.

Final Office Action from U.S. Appl. No. 13/223,312 mailed Mar. 6, 2014.

Examiner's Answer from U.S. Appl. No. 13/223,312 mailed Nov. 18, 2014.

Examiner's Answer from U.S. Appl. No. 13/223,313 mailed Nov. 12, 2014.

\* cited by examiner

FACILITATED USE OF HETEROGENEOUS HOME-AUTOMATION EDGE COMPONENTS

RELATED APPLICATION(S)

This application is related to co-pending and co-owned U.S. patent application Ser. No. 13/223,312, entitled FACILITATED USE OF CHARACTERIZING ABSTRACTS FOR HETEROGENEOUS HOME-AUTOMATION EDGE COMPONENTS and filed on even date herewith, which is incorporated by reference in its entirety herein.

This application is also related to co-pending and co-owned U.S. patent application Ser. No. 13/223,313, entitled FACILITATED USE OF HETEROGENEOUS HOME-AUTOMATION EDGE COMPONENTS VIA A COMMON APPLICATION PROGRAMMING INTERFACE and filed on even date herewith, which is incorporated by reference in its entirety herein.

TECHNICAL FIELD

This invention relates generally to the automation of residential appliances.

BACKGROUND

Modern homes typically include a wide variety of installed and non-permanently-deployed appliances. Examples in these regards include, but are not limited to, apparatuses that, once installed, comprise a part of the residence's infrastructure (often hidden from view, such as behind walls or doors or in garages or basements). Illustrative examples include, but are not limited to, installed pumps (such as a water pump in a well, a sump pump, or a sewage pump, to note but a few examples in these regards), a central furnace (including heat pumps), a central air conditioner, a central humidity controller, a movable barrier operator (such as a garage door opener, a driveway gate opener, and so forth), a water softener, a garbage disposal, an electronic surveillance and/or security system, an installed electricity generator (such as a gas or natural gas generator, a wind-powered generator, a solar-powered electricity source, and so forth), and lighting fixtures of various kinds.

Other appliance examples include such things as window-installed air conditioners and installed kitchen and laundry appliances (such as, but not limited to, clothes washers, clothes dryers, stoves, ovens, indoor grills, installed exhaust fans, automatic dishwashers, refrigerators, freezers, microwave ovens, trash compactors, and so forth). Other residential appliances are not installed per se and are simply non-permanently set or placed where desired. Examples in these regards include lamps, home-entertainment systems and components, communication-network interfaces (such as land-line telephones, cable connections, and so forth), stand-alone fans, aquarium equipment (such as pumps, filters, and heaters), coffee makers, towel warmers, robotic floor-based vacuum cleaners, and so forth.

"Home automation" refers in general to the automated operation of such residential appliances (typically pursuant to some planned schedule or in response to pre-identified conditions of interest). The nature and modality of the automated operation can vary with the appliance itself. In some cases the automated operation can include physical movement of some part or all of the appliance. In other cases the automated operation can include an operational change of state.

Home-automation systems typically rely upon one or more edge components to effect the desired operation. Numerous examples are known in these regards and included actuators that range from simple electronic switches (having a selectable "on" and "off" state) to sophisticated multi-state electro-mechanical mechanisms. In many cases an edge-component interface serves to control one or more such edge components. Again, numerous examples abound for such edge-component interfaces.

Unfortunately, home-automation systems and components constitute a heterogeneous lot. As a result, considerable incompatibilities exist in terms of communications protocols, instructions, and so forth. This, in turn, makes it considerably more difficult to design, install, access, modify, maintain, operate, and update or expand a home-automation system.

BRIEF DESCRIPTION OF THE DRAWINGS

The above needs are at least partially met through provision of the facilitated use of heterogeneous home-automation edge components described in the following detailed description, particularly when studied in conjunction with the drawings, wherein.

Figure 1:
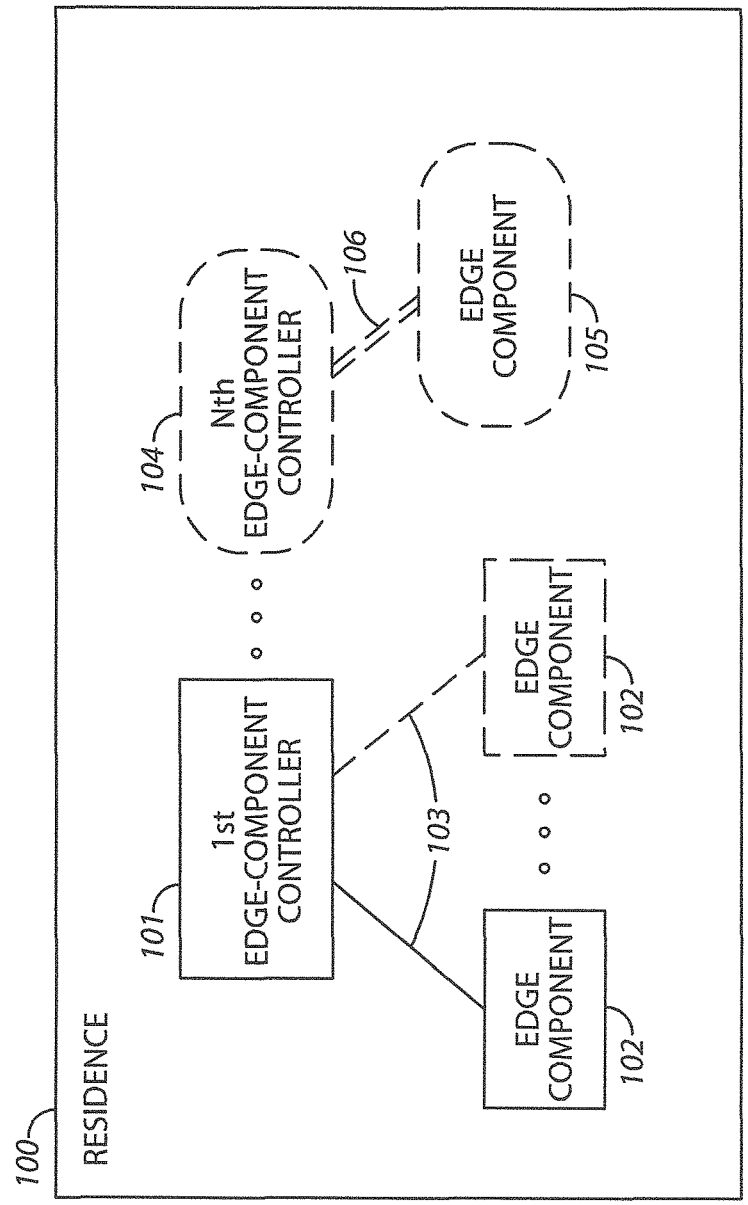
FIG. 1 comprises a block diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a control circuit operably couples to a plurality of home-automation edge-component interfaces. This control circuit is configured to compatibly interact with a plurality of home-automation edge components where at least some of the plurality of home-automation edge components are operationally incompatible with one another.

By one approach this incompatibility arises because of differing communication protocol requirements as pertain to different classes of the home-automation edge components. By another approach this incompatibility arises because categorically-similar home-automation edge components nevertheless have differing selectable operating states.

By one approach the control circuit employs characterizing abstracts for each of the home-automation edge components. This, in turn, permits designing a home-automation system and/or operating a home-automation system comprised of heterogeneous elements at a normalized level of conceptualization.

By one approach, in lieu of the foregoing or in combination therewith, the control circuit can be further configured to employ a corresponding application programming interface in conjunction with one or more application interfaces. So configured, the control circuit can work in cooperation with any of a variety of external applications to facilitate designing and operating a home-automation system notwithstanding that the home-automation system includes heterogeneous (and hence operationally incompatible) components and/or operating standards.

These teachings permit designers to make use of a wide variety of existing home-automation edge components while essentially ignoring otherwise serious concerns regarding incompatible operating circumstances, hence greatly leveraging that established base of tried and proven components. These teachings are also highly scalable and can readily accommodate essentially any previously-developed or hereafter-developed home-automation edge components, home-automation communication protocols, and so forth.

So configured, these teachings will also permit application designers to accommodate or even directly address the home-automation space without also understanding the myriad design and operational differences, nuances, and subtleties that in fact characterize these opportunities.

Before describing these teachings in greater detail, however, it may be helpful to first briefly describe a not-untypical home-automation example that includes heterogeneous systems/components. Referring to FIG. 1, in this illustrative example a given residence 100 includes a first edge-component controller 101 and up to an Nth edge-component controller 104 (where "N" is an integer greater than "1"). These edge-component controllers are manufactured by differing manufacturers and are distributed under differing brands. Examples in these regards include, but are certainly not limited to, Z-Wave, Crestron, Savant, Lutron, and Control4 branded home-automation controllers.

Each of these edge-component controllers, in turn, operably couples to one or more corresponding edge components. For example, in this simple example, the first edge-component controller 101 connects to an unspecified plurality of edge components 102 while the Nth edge-component controller 104 connects to a single edge component 105.

As noted above, such a system comprises a heterogeneous design. In some cases this occurs because the specific functionality of at least some of the edge components varies amongst otherwise-similar classes or types of edge components (often, for example, by manufacturer). As a simple example in these regards, a light-dimmer edge component offered by one manufacturer may offer three selectable levels of brightness while another light-dimmer edge component offered by another manufacturer offers, say, five selectable levels of brightness. As a result, a substantive command to select a dimness state between "off" and fully "on" can become ambiguous and hence ignored or otherwise unachievable.

In other cases this heterogeneous result is owing to differing communication protocol requirements. In this particular illustrative example, the first edge-component controller 101 communicates with its edge components 102 using a first communication protocol 103 whereas the Nth edge-component controller 104 communicates with its edge component 105 using a second communication protocol 106. As is typical in many such scenarios, this second communication protocol 106 is communicatively incompatible with the first communication protocol 103.

Communication protocols can differ in any number of regards. Differences can be based, for example, upon the frequency(ies) used to bear the communications, the type(s) of modulation employed to represent the communication, synchronization and timing requirements, data field and payload specifications, acknowledgement requirements, security requirements (including encryption, authentication credentials, rolling codes, and the like), and so forth. Requirements in these regards can and do vary widely. A few examples of home-automation protocols that vary considerably from one another in these regards include, but are certainly not limited to, the Z-Wave-compatible protocol, the ZigBee-compatible protocol, the Control4-compatible protocol, and the Android@Home-compatible protocol.

It is because of such incompatibilities that implementation of a heterogeneous home-automation system typically results in a number of operational islands. Efforts to further integrate the operations of such technologically-differentiated operational islands tend to be highly specific, custom configurations that are difficult to design, maintain, and upgrade.

Figure 2:
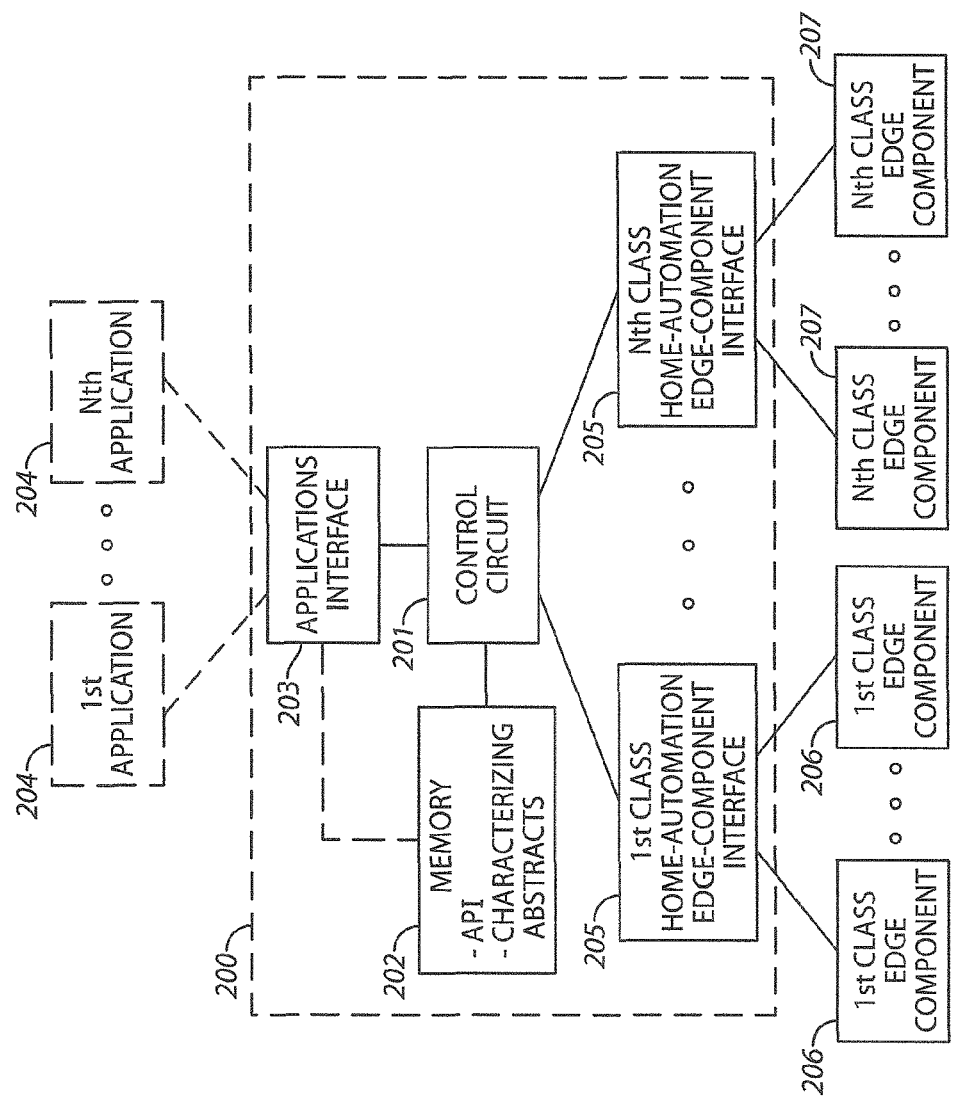
FIG. 2 comprises a block diagram as configured in accordance with various embodiments of the invention.

FIG. 2 presents an illustrative example of a home-automation system that accords with the present teachings. In this example the enabling apparatus 200 includes a control circuit 201 that operably couples to a memory 202 and an application interface 203. Such a control circuit 201 can comprise a fixed-purpose hard-wired platform or can comprise a partially or wholly programmable platform. These architectural options are well known and understood in the art and require no further description here. This control circuit 201 is configured (for example, by using corresponding programming as will be well understood by those skilled in the art) to carry out one or more of the steps, actions, and/or functions described herein.

The memory 202 may be integral to the control circuit 201 or can be physically discrete (in whole or in part) from the control circuit 201 as desired. This memory 202 can also be local with respect to the control circuit 201 (where, for example, both share a common circuit board, chassis, power supply, and/or housing) or can be partially or wholly remote with respect to the control circuit 201 (where, for example, the memory 202 is physically located in another facility, metropolitan area, or even country as compared to the control circuit 201).

This memory 202 can serve, for example, to non-transitorily store the computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than to the volatility of the storage media itself and hence includes both non-volatile memory (such as read-only memory (ROM)) as well as volatile memory (such as an erasable programmable read-only memory (EPROM).

This memory 202 can also serve, if desired, to store characterizing abstracts for a variety of home-automation edge components including home-automation edge components that are operationally incompatible with others of the home-automation edge components. This can comprise, for example, a first class of home-automation edge components and a second (or further) class of home-automation edge components that are operationally compatible with one another. These "classes" may represent, by one approach, differing brands of home-automation edge components as offered by differing manufacturers or distributors.

Such home-automation edge components may also be operationally incompatible due to use of incompatible communications requirements. Accordingly, and without intending any limitations in these regards, the home-automation edge components so abstracted may include home-automation edge components that utilize any of:

Z-Wave-compatible communications requirements;
ZigBee-compatible communications requirements;
Crestron-compatible communications requirements;
Control4-compatible communications requirements; and
Android@Home-compatible communications requirements.

These characterizing abstracts characterize the home-automation edge components with respect to any of a plurality of properties. Generally speaking, for example, a characterizing abstract for a given home-automation edge component can include a generic component name/identifier and one or more high-level functional descriptors. Some simple examples in these regards are:

Light dimmer—off, on, set level, toggle;
Water valve—open, closed;
Motor servo—on (forward), on (reverse), off;
Switch—off, on, toggle;
Thermostat—AC on, AC off, heat on, heat off, set temperature, set temperature range, fan on, fan off;
Door lock—lock, unlock, set code;
Window shade—raise, lower, set level;
Pool heater—on, off, set temperature, set temperature range; and
Motion sensor—set sensitivity, set delay;

to note but a few examples in these regards.

These characterizing abstracts can include other information as desired. Some examples in these regards include branding, intended (or actual) deployment location (for example, by room (such as "living room") or by functional location (such as "near water heater")), manufacturer, vender, make, model, or the like. If desired, these characterizing abstracts can include relevant operational requirements or limitations of interest. Such information could reflect the weight of the home-automation edge component, temperature range limitations, water resistance, maintenance recommendations, power requirements, noise emissions, and so forth.

These characterizing abstracts can be arranged and stored in the memory 202 using any number of data-storage paradigms including table-based approaches and/or hierarchical-tree-based approaches as desired. By one approach these characterizing abstracts are provisioned by the manufacturer of the apparatus 200. In any event, these characterizing abstracts can be updated using any number of approaches in these regards. For example, by one approach the control circuit 201 can occasionally inquire (using, for example, the aforementioned applications interface 203 or some other available connection) regarding available updates for this information and download the updates as desired. As another example an end user or other authorized person could personally load updated information into the memory 202 using, for example, a user interface (not shown) such as a keyboard, touch-screen display, cursor-control device, and so forth.

So provisioned, the control circuit 201 can be configured to use these characterizing abstracts to facilitate the design, use, and/or maintenance or updating of a variety of heterogeneous home-automation edge components. A designer can, for example, design particular home-automation systems, scenes, and tasks that employ all manner of otherwise incompatible home-automation edge components without becoming embroiled in the details, nuances, and issues that attend the use of such disparate components. The control circuit 201, however, being aware of the specific operating requirements of each such component, can effectively translate designs formed using those higher-level abstracted views of such components into instructions and communications that are suitable for compatible use with such components.

By one approach, in lieu of the foregoing or in combination therewith, the memory 202 can also store an application programming interface that the control circuit 201 can utilize to communicate with any of a variety of applications 204 to facilitate designing home-automation systems and/or the conveyance of specific home-automation instructions/information in conjunction with those applications. An application programming interface (API), of course, is a particular set of rules and specifications that software programs can follow to compatibly and successfully communicate with one other.

An API in particular serves as an interface between different software programs and facilitates their interaction. This API can serve, for example, to effectively define the vocabulary and resources-request conventions (for example, by establishing function-calling conventions that refer to, use, or otherwise leverage the aforementioned characterizing abstracts) of the dialogue between the control circuit 201 and these applications 204. Accordingly the API may include specifications for routines, data structures, object classes, and protocols used to communicate between the control circuit 201 and these applications 204.

Though these teachings will accommodate a language-dependent approach in these regards, for many application settings it will be beneficial for the API to be language-independent and hence able to work successfully with a variety of programming languages. It may also be beneficial for many applications to design and distribute the API as an open API.

With continued reference to FIG. 2, the apparatus 200 can further include one or more classes of home-automation edge-component interfaces 205 that each operably couple to the control circuit 201. The control circuit 201 is configured to interact with these home-automation edge-component interfaces 205 to thereby interact with their edge components. In this illustrative example, a first class of home-automation edge-component interfaces 205 (such as a Z-Wave controller) communicatively couples to a plurality of corresponding edge components 206 of the same class (i.e., Z-Wave) while an Nth class of home-automation edge-component interface (such as a ZigBee controller) communicatively couples to a plurality of corresponding edge components 207 of the same class (i.e., ZigBee).

Configured as described above, for example, the control circuit 201 can compatibly interact with this heterogeneous group of edge components via the home-automation edge-component interfaces 205. This can include, for example, receiving information (such as sensor data from home-automation edge components that comprise sensors) and compatibly instructing home-automation edge components that comprise actuators. Received information, in turn, can be passed on by the control circuit 201 to one or more applications 204 via the applications interface 203.

Similarly, such instructions can themselves be received by the control circuit 201 from one or more of the applications 204, either in general as part of an overall home-automation design or specifically as in the case of an application-sourced real-time instruction. Examples of specific messages that can be supported by these teachings include a command message, a response message, and an event message (where examples of an "event" include, but are not limited to, user interactions with a user interface (such as a button or switch), that a given sensor senses a predetermined trigger condition (such as someone entering a particular monitored area or the sun rising or setting), alterations of a system setting (such as someone changing a temperature setting or a door-entry code), changes to a system condition of interest (such as a network component moving out of range or failing to acknowledge a communication), and so forth).

Figure 3:
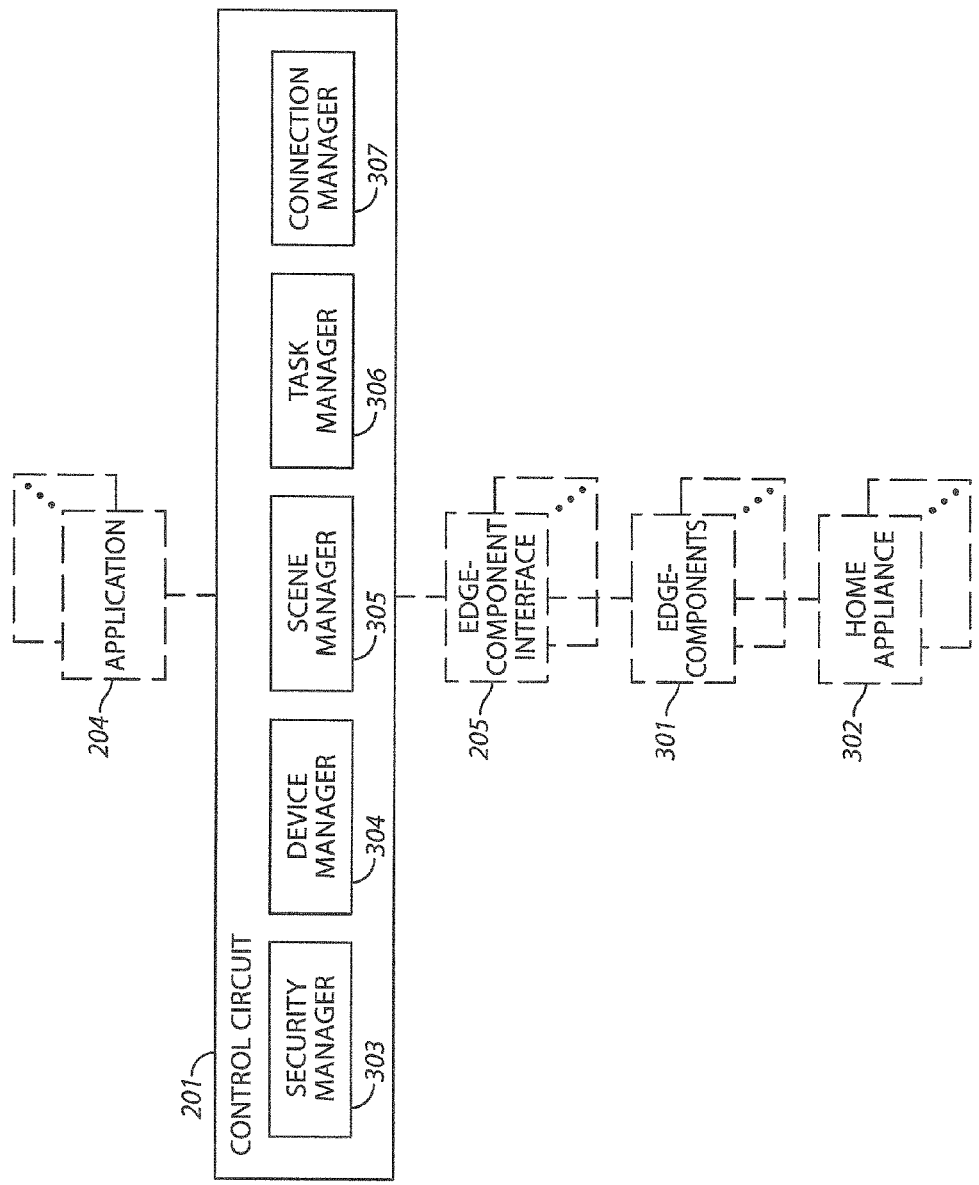
FIG. 3 comprises a block diagram as configured in accordance with various embodiments of the invention.

These teachings are highly flexible in use and will accommodate a wide variety of embellishments as desired. FIG. 3 provides some illustrative examples in these regards.

FIG. 3 illustrates, for example, that the control circuit 201 can include a variety of functional capabilities. Various managers enable these various capabilities and include a security manager 303, a device manager 304, a scene manager 305, a task manager 306, and a connection manager 307.

The security manager 303 can serve, for example, to encrypt/decrypt communications with one or more of the applications 204 and/or the edge-component interfaces 205 as desired. The security manager 303 can also serve, as desired, to authenticate that a given application is authorized to provide a home-automation program or instruction to the control circuit 201 or to receive information sourced by an edge component.

The device manager 304 can serve, for example, to maintain, track, and otherwise work with and interpret the aforementioned characterizing abstractions. This can include, by one approach, converting higher-level automation instructions (as provided, for example, by an application 204) into instructions suitable to provide to one or more of the edge-component interfaces 205. The device manager 304 can further serve to manage messaging and notifications for the various elements of the system.

The scene manager 305 can serve, for example, to manage automation scenes. As used herein, a "scene" will be understood to refer to a specific setting for one or more home appliances 302. For example, a "Watch TV in the living room" scene can include turning off all living room lighting with the exception of one specific light that is dimmed instead. It should be noted that a given scene may include a variety of heterogeneous components/interfaces and that the scene manager 305 can cooperate with the device manager 304 to ensure that these various elements are properly employed to achieve the specified scene.

The task manager 306 can serve, for example, to carry out scripts to thereby achieve a sequence of automated events and/or to permit the home-automation system to automatically respond to a given predetermined monitored stimulus. For example, a given task can comprise responding to an automatic detection of smoke by sounding an audible alarm using a first home appliance, illuminating various lights to thereby further aid in awakening the residents of the home while also illuminating the exit pathways, and calling an emergency response service (such as a 911 service) and reporting the detection of smoke using a prerecorded spoken message. The scene manager 305 can serve as a scheduler when one or more tasks comprise scheduled tasks. As with scenes, a given task may include a variety of heterogeneous components/interfaces and the task manager 306 can cooperate with the device manager 304 as well as the scene manager 305 to ensure that the various home appliances 302 are properly employed to carry out the specified task.

The connection manager 307 can serve, for example, to manage the control circuit's connections with one or more applications 204. This can include, by one approach, initiating and/or accepting a given communication, maintaining a given communication session, and so forth. Depending upon the application setting this may include cooperating with the security manager 303 to support any utilized encryption or authentication protocols. Generally speaking, these teachings will accommodate a wide range of communications protocols and methodologies in these regards. For many application settings it may be particularly useful to support the employment of transmission control protocol (TCP) in these regards, alone or in conjunction with Javascript object notation (JSON) (both of these approaches being well understood in the art).

These teachings are readily and economically enabled and deployed and permit a wide variety of applications to successfully and easily facilitate or otherwise interact with a home-automation system regardless of how heterogeneous the controllers and/or edge components of that system may be. Examples of applications that can be successfully accommodated in these regards include, but are not limited to, web-based applications (including so-called cloud servers), cellular telephones (and other portable two-way communications devices), home-entertainment systems (such as televisions, home theaters, and so forth), so-called set-top boxes (that typically receive broadcast multi-media content via a cable, satellite, or digital-subscriber line interface), and so forth.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. An apparatus comprising:
   home-automation edge-component interfaces;
   a hardware-based control circuit operably coupled to the home-automation edge-component interfaces,
   wherein the control circuit is configured to compatibly interact with a plurality of home-automation edge components including at least a first home-automation edge-component interface that operates compatibly with a first class of home-automation edge components that comprise a first brand of home-automation edge components and a second home-automation edge-component interface that operates compatibly with a second class of home-automation edge components that comprise a second, different brand of home-automation edge components, wherein specific remotely-selectable operating states apart from communication protocol requirements of at least some of the home-automation edge components differs amongst otherwise-similar classes or types of home-automation edge components such that at least some home-automation edge components of the first class of home-automation edge components will have at least one non-communication protocol operating state that is not available to at least one categorically-similar home-automation edge component of the second class of home-automation edge components, such that the first class of home-automation edge components are operationally incompatible with the second class of home-automation edge components, and wherein the control circuit is configured to interact with the plurality of home-automation edge components, at least in part, by compatibly receiving sensor data from home-automation edge components that comprise sensors and compatibly instructing home-automation edge components that comprise actuators, and
   wherein the home-automation edge components at least include a plurality and variety of installed appliances including at least one from a group comprising a home temperature control component, a liquid pumping component, and a movable barrier operator and at least one from a group comprising a laundry appliance and a kitchen appliance and a plurality and variety of nonpermanently-deployed appliances including at least one from a group comprising a lighting component, a home-entertainment component, and a communication component.

2. The apparatus of claim 1 wherein the control circuit is configured to compatibly interact with the plurality of home-automation edge components by employing characterizing abstracts for the home-automation edge components.

3. The apparatus of claim 2 wherein the characterizing abstracts characterize the home-automation edge components with respect to a plurality of properties.

4. The apparatus of claim 3 wherein the plurality of properties include at least one of a group consisting of:
   an identifier;
   a generic component name;
   a branded component name;
   a functional descriptor;
   a deployed location;
   a manufacturer;
   a vender;
   a make;
   a model.

5. The apparatus of claim 2 wherein the control circuit is configured to employ the characterizing abstracts via a corresponding application programming interface that employs the characterizing abstracts.

6. The apparatus of claim 1 wherein the control circuit comprises a scene manager to implement predetermined automation scenes that employ incompatible groupings of the home-automation edge components.

7. The apparatus of claim 1 wherein the home-automation edge-component interfaces include at least one from a group consisting of:
   a Z-Wave-compatible edge-component interface;
   a ZigBee-compatible edge-component interface;
   a Control4-compatible edge-component interface;
   an Android@Home-compatible edge-component interface.

8. The apparatus of claim 7 wherein the home-automation edge component interfaces include at least two from a group consisting of:
   a Z-Wave-compatible edge-component interface;
   a ZigBee-compatible edge-component interface;
   a Control4-compatible edge-component interface;
   an Android@Home-compatible edge-component interface.

* * * * *